March 1, 1927.

C. C. BALSTON

TYPEWRITING MACHINE

Filed Dec. 25, 1926

Inventor
Clyde C. Balston,
By his Attorney
T. F. Bourne

March 1, 1927. 1,619,691
C. C. BALSTON
TYPEWRITING MACHINE
Filed Dec. 25, 1926   7 Sheets-Sheet 3

Inventor
Clyde C. Balston,
By his Attorney
T. F. Bourne

March 1, 1927.

C. C. BALSTON

TYPEWRITING MACHINE

Filed Dec. 25, 1926

Inventor
Clyde C. Balston;
By his Attorney
P. F. Bourne

March 1, 1927.
C. C. BALSTON
TYPEWRITING MACHINE
Filed Dec. 25, 1926
1,619,691
7 Sheets-Sheet 5
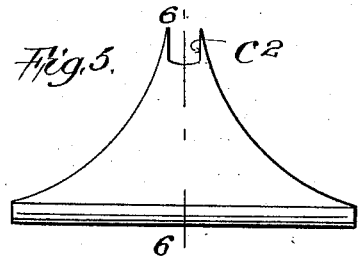
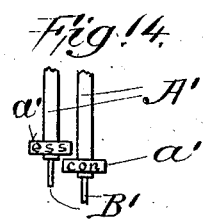
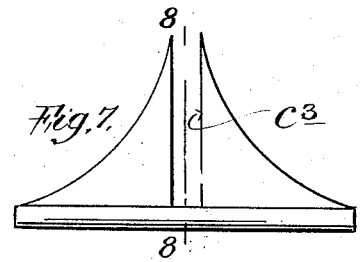
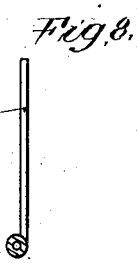
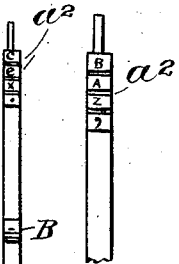
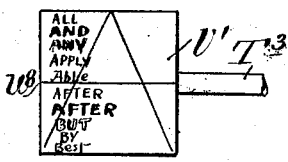
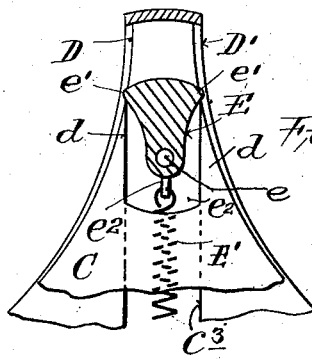
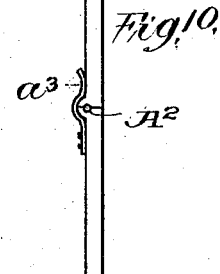
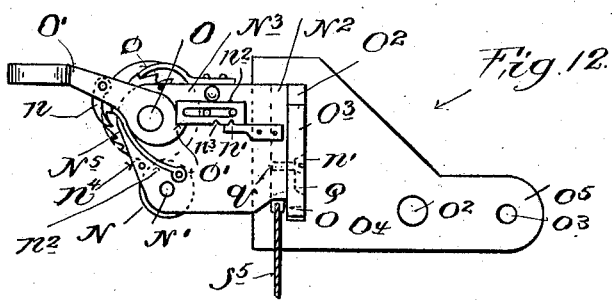
Inventor
Clyde C. Balston.
By his Attorney
T. F. Bourne

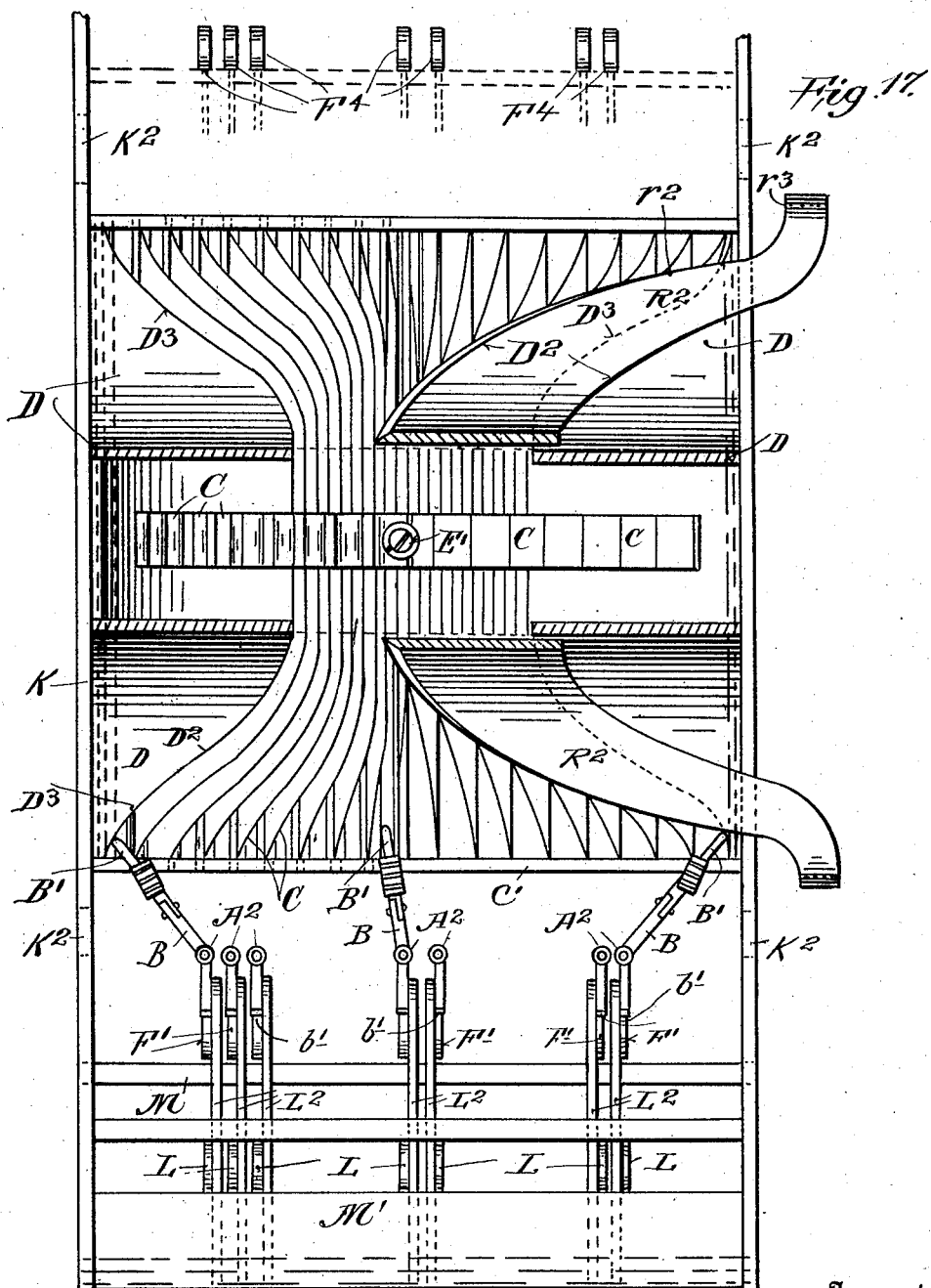

March 1, 1927.
C. C. BALSTON
1,619,691
TYPEWRITING MACHINE
Filed Dec. 25, 1926　　　7 Sheets-Sheet 7
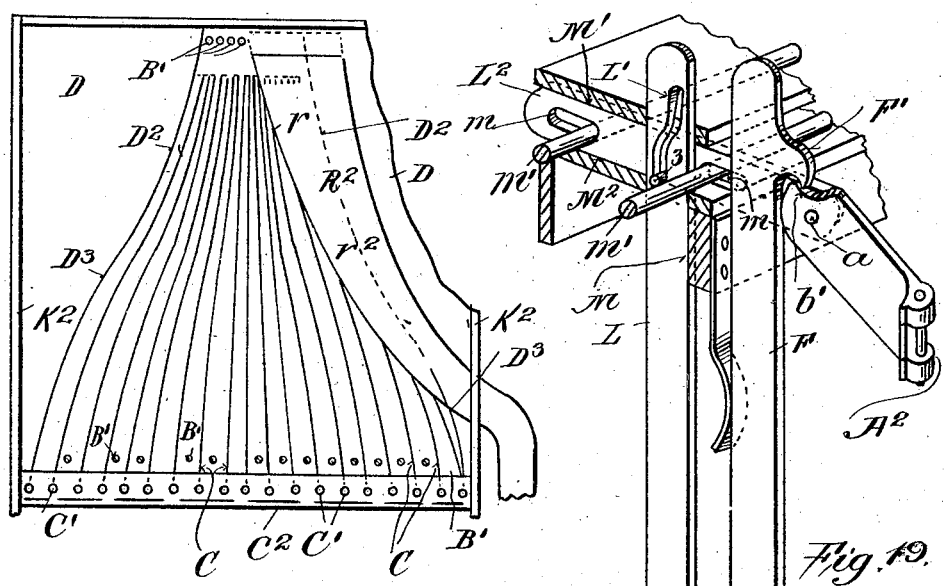
Fig.18.
Fig.19.
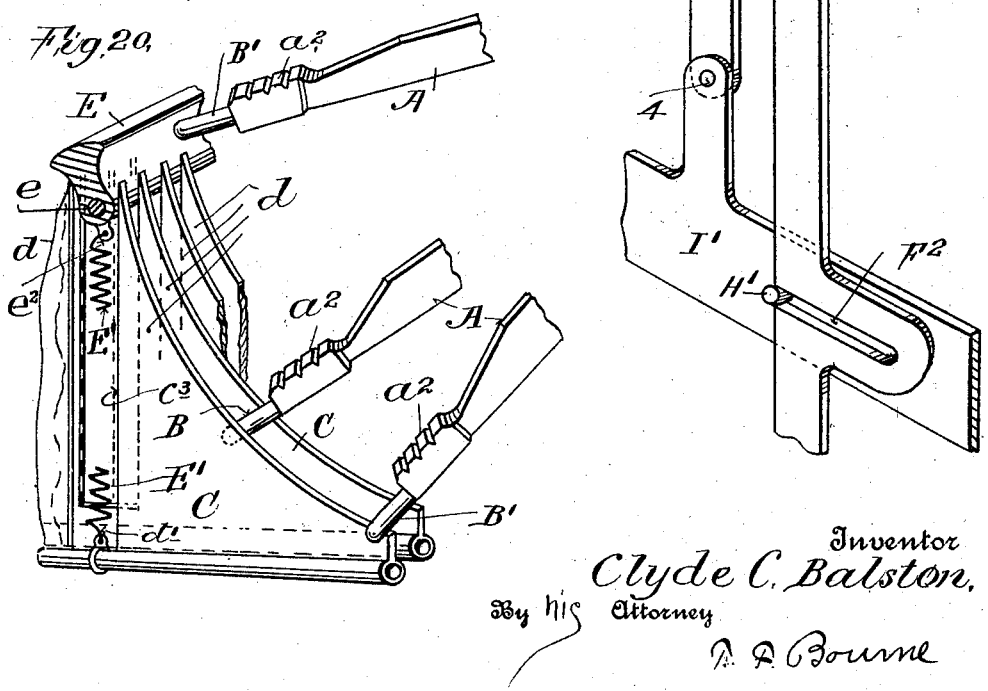
Fig.20.
Inventor
Clyde C. Balston,
By his Attorney
P. P. Bourne Patented Mar. 1, 1927.

1,619,691

UNITED STATES PATENT OFFICE.

CLYDE C. BALSTON, OF NEW YORK, N. Y.

TYPEWRITING MACHINE.

Application filed December 25, 1926. Serial No. 157,002.

My invention consists in certain new and useful improvements in typewriting machines, and the objects of my invention are, first, to so construct a type bar machine that several characters may be moved into alignment for the impression of a word, simultaneously, by the depression of one or more keys having words marked thereon; second, to provide the machine with a set of word keys having words thereon so constructed and arranged with necessary mechanism, that a depression of any word key shall set and imprint its respective word or words marked thereon; third, to so construct the machine and parts thereof that the depression of any one of the word keys shall set and imprint respectively a number of words marked on a word key; fourth, a simple means for instantaneously altering at will the word type combination of any or all keys simultaneously to produce the different words marked thereon; fifth, a machine which shall also be provided with a set of ready formed type grouped into sets of two, three or four characters, secured to type supports, and representing prefixes and suffixes, and small words, either of which said prefix or suffix group may be moved into printing position and impressed by the depression of a prefix or suffix key; sixth, a variable feed adapted to actuate the carriage to move a space corresponding with the number of type characters moved into printing position; seventh, a mechanism so constructed as to allow the type supports and type to resume their normal position, while any or all of the keys of either series are still depressed. With these objects in view reference is had to the accompanying drawings in which—

Figure 1:
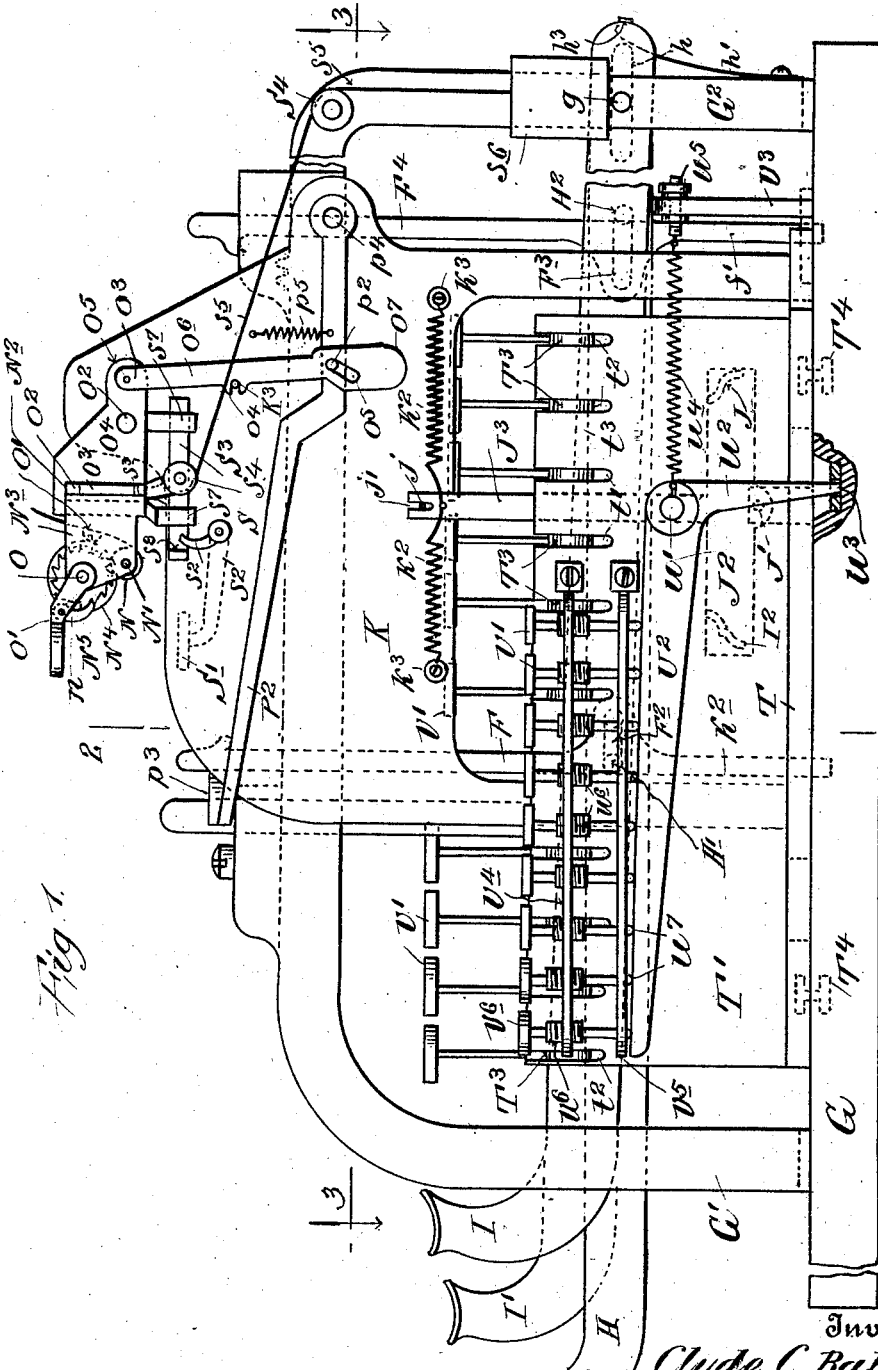
Figure 1 is a side elevation of the complete machine.
Figure 2:
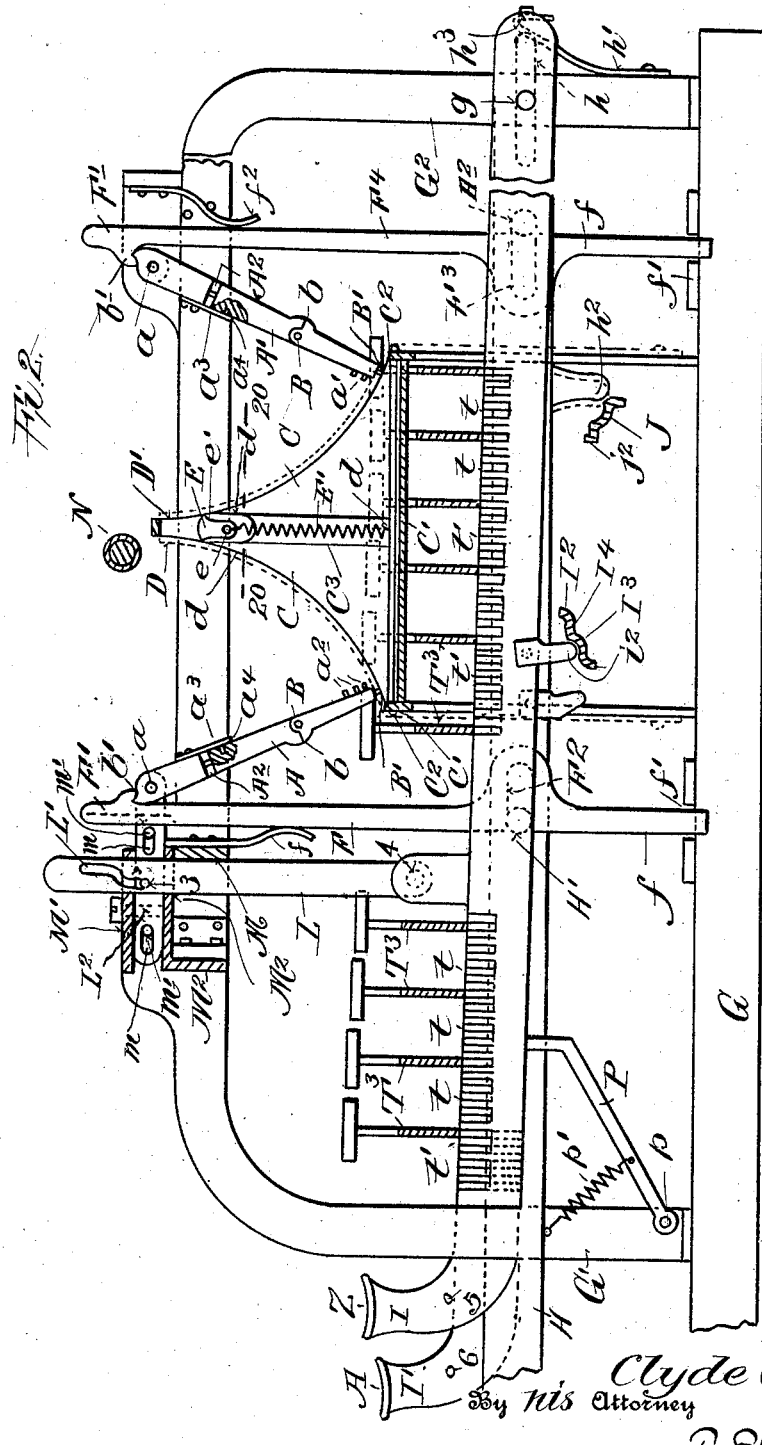
Figure 2 is a partly sectional view of the machine, and shows the style of type arm, its action and shifting device and the key levers and manner of connection with the type arms, their action upon the carriage, and the manner of construction and operation with the word transverse bars.
Figure 3:
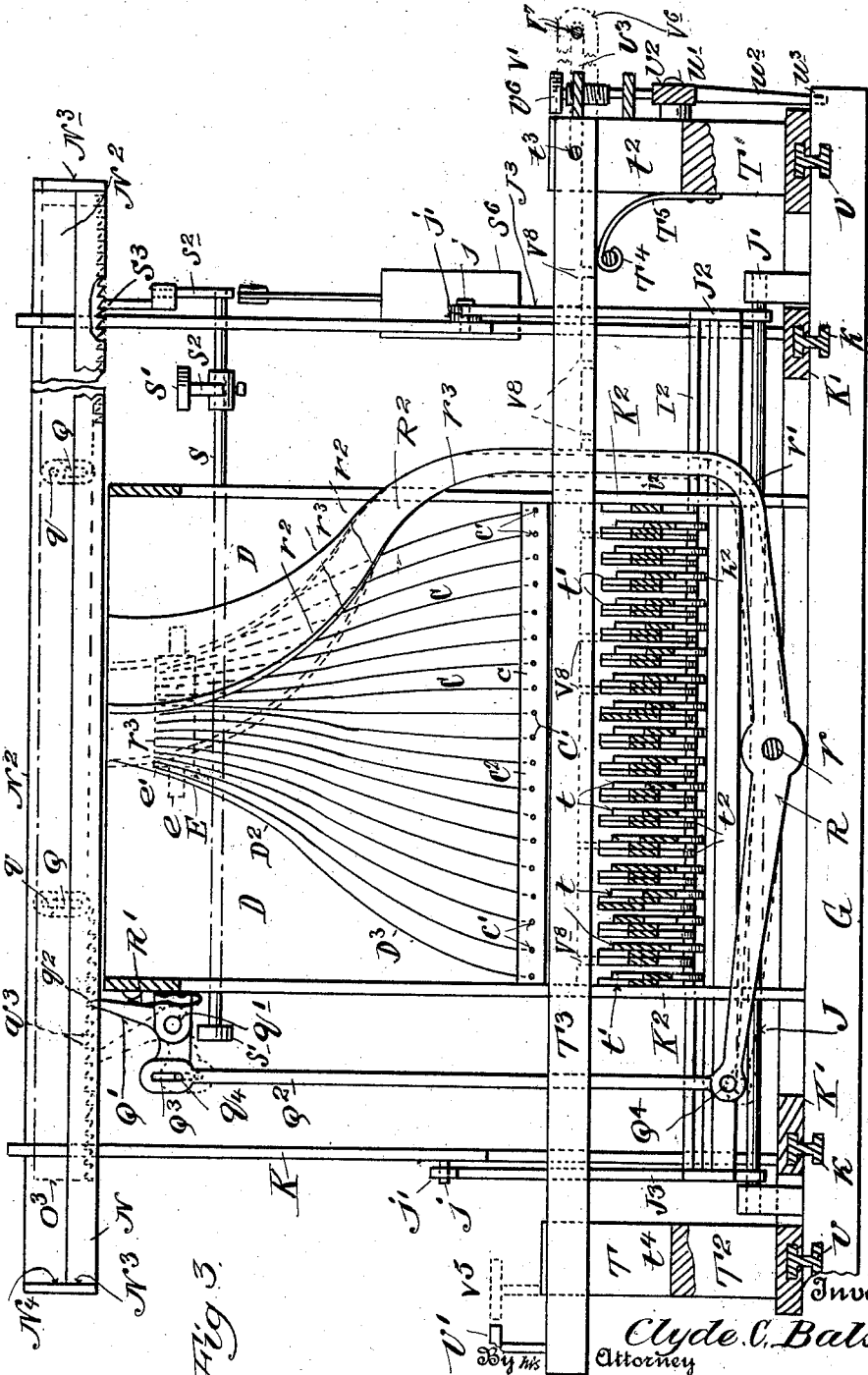
Figure 3 is a front view of the machine, partly removed and partly in cross section.

Figure 4 represents a plan view of the machine, the upper half being removed above the line 3—3, Fig. 1, and shows more clearly the position and arrangement of the key levers, the transverse word bars and keys, the means for shifting the same to alter the word combinations, and also shows the arrangement of the single character, and prefix and suffix keys, the levers being necessarily broken to make room for the key bed which is shown detached;

Figure 5 shows the plan of one of the thin guide plates shown in position in Figs. 2 and 3;

Figure 6 is a cross sectional view of the construction of the same on the lines 6—6, of Fig. 5;

Figure 7 shows the form of one of the more centrally located guide plates, and has an opening to freely admit a tension spring;

Figure 8 being a cross sectional view of the same on the lines 8—8 of Fig. 7;

Figure 9 is an enlarged view broken and partly in cross section of the type assembling and disassembling mechanism of Figs. 2 and 3, and shows a portion of a guide plate of Figs. 5 and 7 in position, the knock off and tension spring for the same;

Figure 10 is a plan view of a type arm or bar of Fig. 2;

Figure 11 is an enlarged broken view of the end of the type arm or support of Fig. 10;

Figure 12 is an enlarged view of the end of the carriage showing an end of the feed rack, roll, and line spacing mechanism; also a movable set for said mechanism;

Figure 13 is an enlarged view of a word key showing the style of characters of words placed upon the same; the designation of the said key by a character corresponding to the initial characters of the words placed upon the key and a dividing line crossing the middle part of said key;

Figure 14 is a view of the end of type supports partly broken away, showing the position and arrangement of the groups of prefix or suffix characters;

Figure 15 is an end view showing a modified form of type support ends and illustrates means to prevent their locking one under another when assembling;

Figure 16 is a side broken view of one of the type supports of Figure 15;

Figure 17 is a plan view of part of the machine, part of the mechanism being left out for the sake of clearness;

Figure 18 is a detail face view of a portion of Figure 3, showing the pins B′ of the type supports, certain of said pins being shown raised;

Figure 19 is a detail perspective view, enlarged, of means for actuating a type support; and Figure 20 is a detail perspective view illustrating three different positions of type supports in their travel from normal position to operative position.

In the annexed drawings A represents a type bar having several type $a^2$, and being pivoted to a portion of the machine, (A' representing a bar similar in all respects to A except that it supports one or two groups of type $a'$, whose line of alignment is at about right angles with the longitudinal line of its arm or bar) there being about twenty A supports and about fifteen or twenty A' supports. The said type supports are adapted to break or bend laterally out of their straight lines by means of the hinges $A^2$, but are held in proper straight position each by a spring $a^3$ secured to one piece of the arm and bearing upon or attached as at $a^4$ to the other part of the same. The said type arms have also each a hinge B to allow them to break in a vertical or opposite line to the aforesaid hinges and are provided with shoulders $b$ to limit their movement in their return to their normal position. The free ends of the said type arms are provided with projecting pins B' which fit into the spaces formed between the guide plates C, Figs. 2, 3, 18 and 20, the said plates C being pivoted or movably attached as at $c$ by pins $c'$ to the edges $C^2$ of a plate C', the upper ends of the plates C being laterally movable and being made of flexible material. The plates C' also support the concave faced main guide plates D. In the space between the inner curved edges $D^2$, $D^3$, of plates D, the guide plates C are located, and they conform approximately on their edges to the curved surfaces of the plates D. The faces of the plates D are curved to substantially follow the arc described by the movement of the type arms on their pivots $a$. The plates D are secured to the main frame. Located in the slots $c^2$, $c^3$, is a knock-off E pivoted at $e$ (Figs. 5, 7 and 9 enlarged view) and having the edges $e'$ $e'$ which project beyond and into and break the line of the circle described by the type arm, the said edges $e'$ $e'$ projecting over the concave edge of the thin guide or separator plates C at their free ends or points $d$ $d$. To the lower part of the dog or knock-off E is attached at $e^2$ a spring E', the object of this spring being to maintain the dog in an upright position, the said spring being located within the openings $c^3$ and secured at its other end $d'$ to a rod or guide plate C, or otherwise attached to a permanent portion of the machine frame.

The object of the knockoff or dog E is that when one or more keys are depressed and one or more type arms are moved toward the platen their pins B' moving between the edges of the plates C are guided in the converging direction of the said plates, toward the printing point, the type arms by means of the hinges $A^2$ as described moving in the direction that the said pins are guided, when as the said pins of the type arms glide against either of the edges $e'$ they push the said dog out of normal position until they pass above it, when it is returned to the normal position by means of spring E'. With the return of the type arms to their starting point, by the return of the key levers or the automatic tripping of the mechanism, as will be directly described, the said type arms falling by means of their own weight which may be heavier than the ordinary to overcome friction with the guide plates, or by the action of a spring, their pins bear upon the top part of the corresponding edge $e'$, the down pressure being too direct toward the pivot $e$ to rotate the said knock off, whereby the knock off causes the type arms to break or bend on their hinges, the pins B' being thus moved out from between the guide plates C, and as the said pins and arms are released from the said plates, they straighten themselves laterally by means of the spring $a^3$, and hinges $A^2$ and thus return to their normal positions and thereby replace their ends or pins again between the bottom portions of the plates C. Adapted to engage and release with a downward movement is a flat piece F loosely engaging by means of a hook F' a projection or heel $b'$ on each type arm and being held forward and in proper position by a spring, the opposite end $f$ of the said piece passing through a guide piece $f'$ attached to the machine frame or the bed G. In the said piece F is also placed a laterally extending slot $F^2$ into which is adapted to fit a short pin H' of a key lever H. These key levers are arranged in groups of three each, the levers H as here designated being the middle levers. They are also provided each with a similar pin $H^2$ which is adapted to engage in similar manner a slot $F^3$ in a similarly formed piece, designated $F^4$, which pieces are adapted to operate the prefix and suffix type supports. The levers H are provided each with a longitudinal slot $h$ and are pivoted by a bar or rod $g$ to the machine frame or standard $G^2$. These levers are about twenty in number, and bear the bottom row of keys shown in the key board, Fig. 4, and all represent preferably only consonant characters, (although the characters on the type bars may be arranged differently with regard to any of the keys if desired) but may be provided as in Fig. 4 with keys bearing prefixes and suffixes of words together with the consonants; they are adapted also to be shifted longitudinally normally in forward position when if depressed they will engage by means of the pin and slot H' $F^2$, as described, and operate the type supports bearing the type for impression of single characters or for the combinations of single characters for a word, as will be described later; when shifted backward or when the keys are drawn from the machine in the opposite position the said pins and slots are disengaged and the pins H², and the slots F³ in the pieces F⁴ are brought into engagement for operating the prefix and suffix type supports according to the key and bar shifted. The said levers are held in normal longitudinal position by a spring or springs h'. A projection h² is attached to said levers and is adapted when the levers are depressed to bear upon and move across bar J which passes under all of the key levers and is connected at its ends solidly with a rocker J² pivoted to a shaft J' journaled in the machine frame and from the said rocker projects at right angles arms J³ having slots or holes j' j', Figs. 2 and 3, which engage pins or lugs j j of plates k k which are supported vertically by a base frame K' through two parallel portions of which are formed guide grooves formed to receive parallel guides formed as shown at K, which are secured firmly to the machine bed. The plates K support the carriage roll, and are adapted to be shifted by the operation of the levers, through the mechanism just described and move laterally the position of the said roll, Figs. 1, 2 and 3. The right hand levers I are detached or disconnected levers, and are loosely pivoted in the same manner as described, and are provided in like manner with projections i² which are adapted, when the levers are depressed, to bear upon the step i³ of the cross bar or piece I² whose ends like those of the cross bar J are secured to the rocker J² at the opposite side of the rocker shaft J'. The cross bar or piece I² is provided with a second step I⁴ the function of which will soon be set forth. The said right hand or upper levers I are likewise only fitted with keys having consonant characters, and numerals, and punctuations, and they are all elevated some distance at their free ends above the middle levers and are so constructed as to operate in their downward movement upon the carriage shifting mechanism, as set forth, and upon the middle levers H by means of small pins or lugs 5, which lap over and are elevated above the said middle levers H.

The left hand key levers designated L' all support vowel keys only and are about the same in number as either of the series of consonant levers, the vowels being repeated several times to make up the desired number of characters for the series. (see key board Fig. 4). They are provided each with a pin 6 elevated above and lapping over the tops of the middle levers H, the said levers themselves also being at their free ends, elevated, as described, above the middle levers and are loosely connected with preferably flat pieces L at the point 4 by means of projections above their upper edges. Near their upper or free ends in each of the pieces L are formed irregular slots or inclines L' into which loosely fits and is adapted to move a pin 3 firmly secured to a sliding piece L², to the end of which each type support is pivoted at 2; the pieces L² corresponding in number to the type supports A. Through elongated slots m m in the pieces L² may be passed guide rods m' m' or the said pieces may be held in place and slide between guide plates M' and M² securely fastened to the part M of the frame.

For imprinting single characters or several by the depression of one or more levers the operation may be described as follows: Let us assume that the normal position of the paper roll N is shifted forward as shown in Fig. 2, so that the first type nearest to the free ends of any of the type supports mounted toward the front of the machine, if thrown into printing position, would be impressed, and that the said type are placed in order on the support operated by the first group of three levers as shown in Fig. 11, ranging from the free end of said support B, A, Z, (the arrangement corresponding in all other type supports with the order of each group of keys and their levers) the arrangement of the character keys of the bed being that the keys of the first row in the key bed are placed in alphabetical order (omitting all vowels) beginning B, C, D, F, G, H, J, etc., and that the keys of the second row are all vowels and ranged (preferably) from left to right, and repeating about three times the number of vowels, viz, A, E, I, O, I, Y, A, E, I, etc., as shown in the key bed; and that the third or other rows of character keys is composed entirely of consonants, and ranged in opposite directions to the first row of consonants, beginning at the right hand and running in alphabetical order toward the left hand, B, C, D, F, G, H, J. This plan is employed in order that more than one letter of a kind may be found in a different part of the bed and used in the construction of a word without unnecessarily increasing the size of the said bed or the number of type characters. The punctuations and numerals are also placed upon this latter row of keys and are employed in shifted position.

Combined with the first row of keys are prefixes and suffixes of words which are employed in shifted position when the said levers operate the prefix and suffix type supports, and running crossways under all of the levers is a bar or plate P slotted at P' laterally to have a bearing against the under edge of the said levers to hold them up in normal position, the said bar or plate being attached to the supports P which are pivoted at $p$ at opposite points to the machine bed or frame G', a spring $p'$ holding the said plate or bar, upward and parallel, and, by means thereof, the levers I H I' upward in normal position.

When a key lever is operated which operates the piece F its hook F' bearing down upon and thereby throwing the type support into printing position by means of the heel $b'$ on the same, may slip the said heel of the type support when the latter has turned a sufficient distance, and thereby allow the return of the said support to its normal position while its key lever or levers are still depressed, and spring $p'$ and piece F will return it again to engage the said heel $b'$ or the said piece F may be so arranged that it will not slip the type support, though the former plan is preferable as facilitating speed in operating. Considering the foregoing, if a lever designated H, and having for instance, the character key marked B and CON is depressed, its pin H' normally located in the slot $F^2$ of the piece F acts, through the mechanism described, to throw the type support against the printing surface, when the first type nearest its free end and designated B, agreeing with the key B depressed is thereby impressed when the said support and lever then resume their normal position, either before or after the finger is raised from the key, and the platen feeds forward a space as will be later explained. If the said lever H is drawn toward the operator, the projection $h^2$ glides upon the part $j^2$ of the cross bar J and thereby as previously described shifts the platen and carriage laterally over to position for the first characters CON of the type support, and the pin H' by the said movement disengages from the slot $F^2$ of the piece F and the pin $H^2$ is simultaneously moved into engagement with the piece $F^4$ by means of the slot $F^3$ when, if the said lever is depressed, the first group of characters of the prefix type support, designated CON on the aforesaid key, will be impressed by the said support striking against the platen N, then returning to its normal position with the key lever as described. As the lever H is drawn out, a lug $h^3$ bearing against the end of the lever I draws the latter forward with it, thereby moving its lug $i^2$ away from the cross bar $I^2$ as the lug $h^2$ of the lever H mounts the other cross bar J, both bars returning to their normal longitudinal positions by the re-action of spring $h'$ bearing against said lever, the platen also resuming its normal position with the release of a key lever by the action of springs $k^2 k^2$ secured to the arm $J^3$ and to turn posts $k^3 k^3$.

A pressure upon the left hand lever designated I' and marked with the key character A, draws down upon the piece L and by the connection as at 4 and pin 3 and slot L' moves inwardly the piece $L^2$ which supports the type support and thereby moves the type arm toward, and by means of the guide pin B', farther in between the guide plates C until the second type marked A on the type support occupies the position first occupied by the first type B, when the pin 6 bears upon the upper edge of the lever H and forces it down, thereby moving the type support against the platen and imprinting the second type A. Pressure upon the lever I having the character key marked Z and comma (,) operates by means of the pin 5 and pin $b^2$ and the cross bar $I^2$ to move the platen over its respective type next in order on the type support, since the pin 6 bears down the lever H and thus throws up the said type support against the platen. Pushing the lever I in longitudinally until the lug $i^2$ mounts the second or upper raise $I^4$ of the cross bar $I^2$ thus moves the platen as described one space farther and over the next type on the type support when the comma (,) becomes impressed by a downward push in the manner related.

The platen N is journaled by means of a pivot or shaft N' in the ends $N^3$ which form a part of the sliding piece $N^2$ which is adapted to fit and slide longitudinally in the slots $O^2$ formed in two plates $O^4$ which are pivoted at $o^2$ to the plates K. The platen is supported by means of the extending arm $O^5$ which engages at $o^3$ a bar or piece $O^6$ having lugs $o^4$ which catch normally on a pin $K^3$ on the plate K. The lower part $O^7$ of the pivoted arm catch $O^6$ serves as a weight to hold the same forward and in engagement with the said lock pin $K^3$, and is provided with an inclined slot $o^5$ into which loosely fits a pin $p^2$ securely attached to a lever $P^2$ which is pivoted at $p^4$ to the plate K and is held in a normally elevated position by a spring $p^5$; the lever is provided with a finger button $p^3$ which when depressed operates through the pin and slot to disengage the arm $O^6$ and turn the platen over that the writing may be more easily inspected, the release of the said lever allowing the platen to resume its first position and become again locked in so doing.

Pivoted to the ends $N^3$ and above the platen at O is a line spacing and friction roll $N^4$ which is adapted to bear frictionally upon the writing material and the platen, (enlarged view Fig. 12) and upon one end of the same is a ratchet lock spacing wheel $N^5$ and bearing upon and engaging the same a lock spring $o$; and pivoted to the shaft O is a lever O' having a finger push, and a pawl $n$ engaging the said ratchet wheel, the said lever being held up by a spring $n^2$, and having also a heel $o'$ which limits the downward movement of the lever and consequently the number of lines spaced according to the shifted position of a movable set piece $n^2$ which is held in any set position by notches $n^3$ and spring $n'$. Running parallel with and loosely fastened to the back of the guide piece $N^2$ is a ratchet toothed rack $O^3$ having lateral slots Q through which loosely pass pins or screws $q$ secured firmly in the piece $N^2$. Engaging with and operating the teeth of the said rack is a tooth $q^2$ forming a portion of an angular arm $Q'$ which is pivoted at $q'$ to the machine frame and is provided at the end of its opposite arm with a pin $q^4$ which is loosely engaged by an elongated slot $Q^3$ formed in the end of a rod $Q^2$, which is in turn pivoted at its opposite end $Q^4$ to an irregularly shaped lever R which is trunnioned to a shaft $r$ and is formed as at $r'$ and broadened out into a plate $R^2$ and provided with curved beveled edges $r^2$, $r^2$, $r^2$, said plate being shown in the normal position by the dotted lines $r^3$, $r^3$, $r^3$. The lateral movement of rack $O^3$ permits the return of the dog $Q'$ for feeding the platen. The plate part $R^2$ of the lever is concave in form and lies against and conforms to the curve of the concave edges of the guide plates C. A similar lever plate is fitted in a reverse curve to the opposite edges of the said plates for the feed mechanism of the prefix and suffix characters, and is attached to the opposite end of the shaft $r$. It is not necessary that the plates C should be longer than to pass under the edge of the lever plate $R^2$ where it laps over them. The spring $R'$ holds the curved feed plate $R^2$ and the tooth $q^2$ in forward and normal position, as shown by the tooth at $q^3$, until when a type support is raised its pin B gliding up between the guide plates C which can shift in either direction as it passes moves against the curved edge $r^3$ of the lever feed plate $R^2$, moving it back a sufficient distance to move the tooth $q^2$ two notches backward, and against the spring $R'$ which when the type support returns to its first position throws the said tooth forward two notches, thus moving the carriage two spaces forward, the ratchet feed plate rising and falling as the tooth moves backward each time. The lever feed plate $R^2$ is made to lap over the assembling space a proper distance, so that the first type support set will always cause it to move the tooth $q^2$ two spaces, but each additional type support moved simultaneously into the said space will only add a movement of one additional space to the tooth $q^2$. By means of this operation the space after a word is produced each time with a word. If more than one type support is raised, almost simultaneously in the manner in which a gliding chord is struck on a piano, from left to right, the several type arms will assemble one after the other, and force backward the lever feed plate and feed tooth a distance corresponding to the number of type thus raised, and thus, with the return of the said support, feed the carriage a corresponding distance. The ends of the said type supports are preferably provided at their ends near their pins B with beveled under and upper edge pieces, so that they will glide from one another and rise to an equal level side by side, see Figs. 14 and 15. When a prefix or suffix key is operated its type support being wider at the prefix or suffix type than at the single type support, it will cause feed plate $R^2$ to be moved a distance corresponding to such greater width of the type support and the carriage will move a corresponding distance. The impact of the type against the paper is caused by the impulse given to the keys by the fingers.

In case only a syllable or a portion of a word is imprinted at one touch the "word" space may be thrown out by shifting the carriage backward one notch and then the remainder of the word may be produced without a break. This is effected by the depression of a key $S'$ and lever $S^2$ attached to a rocking bar or rod S and journaled in the machine frame, and having at one end an eccentric or small lever $s^2$ which when the rod is rocked moves upward against the under edge of the lower part of the angle arm $Q'$, thus moving the tooth $q^2$ backward the distance of one notch. (since the movement of the piece $S'$ is limited to that movement), at the same time by means of a short arm $s^2$ the opposite end of the rod S displaces a lock catch $s^3$ which fits into the teeth of the feed rack $O^3$ and is carried by a slide $S^3$ which is fitted in guides $s^7$ $s^7$ on the plate $O^4$ and has loose connections by means of lugs $s^8$ and a short arm $s^2$ secured to the rocking rod S. This operation throws out the lock and moves back the carriage one notch; the finger being raised from the push $S'$ the lock again engages the rack; the lateral movement of the rack $O^3$ enables the rack to escape the catch $s^3$. Pivoted to the slide $S^3$ is a roller or pulley $s^4$, and securely fastened to about the central part of the carriage and running toward its upper end is a cord $s^5$ which passes under and partly around the pulley $s^4$, thereby drawing the slide $S^3$ into locking position with rack $O^3$, said cord passing also over a pulley $S^4$ pivoted to the machine frame and is attached at its opposite end to a weight $s^6$ which places a backward tension on the carriage, so that if the key or push $P^3$ is depressed the platen will be turned back, as when for the inspection of writing, and if the key $S'$ is operated the space after a word will be omitted; but if both keys are depressed the tooth $q^2$ is disengaged by the raising of the platen and rack, and the lock $s^3$ is disengaged and unlocks the said rack, so that the cord and weight cause the carriage and platen to return to their normal position. The key levers are formed of thin metal and are all provided with narrow projections of even length, as shown at $t$ $t$ $t'$ $t'$ made by splitting or stripping the levers, as shown, from their upper edges, right angularly to their lengths, toward or to their longitudinal centres, the levers thus being provided with comb upper edges. Each lever is formed in this manner (as shown in Figs. 2 and 4), and all such projections as are not necessary for the purpose for which they are so formed, i. e., for the production or setting of the type to print whole words or parts thereof at a single depression of a single key, or key and shift key or stop, are removed, thus leaving but certain projections in position and in a line running transversely across all of the levers, all of the projections $t$, Fig. 3, shown in cross section being in line transversely, so that levers or bars placed in such positions at right angles across all of the key levers would, if depressed, bear upon the projections $t$, as shown and depress their respective levers and thus throw or move a combination of type into printing position for the production of a word or syllable. The other outlined projections some of which are shown marked $t'$, form another and other combinations of "sets" for words arranged in other transverse lines and the remainder of the projections form still another set and adapted to be depressed by other transverse bars or levers. In Figs. 1, 2, 3 and 4 are shown a number of transverse bars or levers $T^3$ which are, preferably, made of thin sheet steel and elevated above the key levers and are all pivoted at one end by a pin or pins $t^3$ to guide plate $t^2$ in an elevated portion or side $T'$ of a rectangular frame T, their extreme free ends being placed and guided on their downward movement by slots $t^4$ formed transversely in the elevated side $T^2$ of the frame T. The said transverse bars or levers are placed an equal distance apart and parallel with each other, and are held in elevated position by a spring or springs $T^5$ and a rod $T^4$ passing under all of them, or by other proper supports, and the frame T, $T'$ is secured to the bed by means of longitudinal guides U U securely fastened to the same, and is adapted to slide back and forth upon the said guides which fit loosely in parallel grooves formed in opposite sides of the frame T, $T'$. As the bars $T^3$ are shown crossing or overlying the levers I, $I'$, H, etc., the operation of a bar $T^3$ will cause it to operate upon the corresponding underslotted portions of the levers I, $I'$, H, whereby one bar $T^3$ will operate upon one or more of a set of levers I, H or $I'$ to cause one or more type supports to move its appropriate type to the printing position, and according to the position of the bars $T^3$ relative to the levers I, $I'$ H the number of type supports operated by the depression of a bar $T^3$ will be determined. Each transverse bar $T^3$ has a large key $U'$ (enlarged view Fig. 13) containing, as there shown, ten complete words, (the transverse bars or levers being arranged a number of "projection" spaces apart corresponding with the number of words upon and to be produced by the operation of each key). The number of words placed upon a key may be more or less than the number here shown, and the number of keys may be increased or diminished, as desired, but, since one hundred of the words most commonly used constitute more than fifty per cent of the number of words generally employed in letters, speeches, sermons, lectures, etc., if the number of keys each producing ten words be increased to fifty keys, the number of words which an operater would have ready to set and print by the depression of such keys (with sometimes a shift or stop key to change the combination, and sometimes two depressions of a key or keys as in the case of extra long words which the machine may not be constructed to set and print at one touch or depression of a key) would be five hundred words; this number constitutes a large percentage of the words in general use, excepting technical words and terms as occur in connection with certain businesses or professional usages, and some other words which are so seldom used that it might not be advisable to set a machine to produce them. These bars $T^3$ in their construction and operation, together with the shift keys mentioned above, constitute with the levers I, $I'$, H what may be termed a word selecting mechanism for moving a plurality of said type bars with their type simultaneously into printing positions for the production of a designated group of characters.

The different length dotted lines $u$ represent the words on the keys shown in Fig. 4. An enlarged specimen key with words is shown in Fig. 13, but it is more advisable to have a sufficient number of keys—twenty-six—e. g., so that the words may all be arranged alphabetically, i. e., all of the words beginning with A generally on the first or A key; all of the words beginning with B on the second or B key; with C on the third or C key, etc., all of the keys being also arranged in alphabetical order. In the event of, say forty or fifty word keys being employed, there may be two A keys; two B keys; two C keys, etc. Each of the said keys may be marked with a large thin letter, Fig. 13, e. g., to designate the initial characters of the words placed thereon. This plan of placing all words beginning with letters of a kind on one or two keys is desirable in that, the keys being arranged alphabetically, an operator must know directly where to find any designated word since it must be contained within one or two square inches of space and upon a key upon which all words beginning with like letters are placed, thus rendering it easily possible for an operator to write directly with the machine from dictation without the use of stenography.

Attached to the side T' of the frame T is a lever $U^2$ pivoted at $u'$ and having an arm $u^2$ extending at about right angles from said lever $U^2$ and loosely engaging a purchase portion at $u^3$ of the machine bed. Attached to a post $U^3$ is a tension screw $u^5$ and spring $u^4$ which pull the frame T, T' to normal position, and being attached to the lever $U^2$ or to its pivot $u'$ hold the said lever in normal position. The said lever support stop or shift pin key pins $u^7$ which pass loosely through a lower guide plate $U^5$ and through threaded gauges $u^6$ in an upper guide plate $U^4$ are adapted to be set or screwed to any height in the said plate to limit or gauge the movement of the said stop or shift keys $u^7$. These "shift" or "stop" keys, as here shown, are nine in number—their number corresponding to the number of shift or to the number of positions to which the transverse bars are adapted to be shifted. The first word on every key does not require any "shift" key as each transverse bar or lever is normally in position to set or imprint the first word or words upon its key—thus if there were fifteen word keys employed and each key would produce or set ten different words, there would still be but nine "shift" keys required. If each key were made or set to produce six words, but five "shift" keys would be necessary.

This design is preferable as being simple and sure to "shift" the transverse bars or levers correctly. Its manner of operation is that when the first "shift" key bearing the figure 2 (see Figs. 4 and 1) and marked $U^6$ is depressed it will depress the lever $U^2$, and thus, through the pivot $u'$ and arm $u^2$ will move the frame T T' with the transverse bar or levers forward simultaneously until they each rest above the second line of set projections, similar except in positions, to the projections $t$, in position for depression for the setting or production of the second word on every key, each shift key in order moving the transverse bars or levers one space further and over a different combination of the comb pins for the setting or production of each other set of words on each and all keys; the last or number 10 "shift" key, being the nearest to the pivot $u'$ when depressed, imparts the greatest deflection to the same and thereby causes the transverse bars or levers to shift to their last position over the ninth word pin combinations.

To produce a word, in other than the first combination, it is necessary that the appropriate "shift" key should first be depressed, and then the word key containing the desired word, and in order that the operator may not be inconvenienced or confused, or have to count the position of a word upon a word key, the styles of type with which the words are printed upon the word keys may be different,—e. g., all words of the third position upon all keys may be printed in a different style or type than the words in the second position, and fourth position words on all keys may again differ in style or type, such as large, round, square, heavy, thin, script, etc., from third position, the fifth position differing from the fourth. Then the said styles may be repeated again in the same order for the remaining five words on the keys and if desirable a separator line $u^8$ may pass through the middle of each key, Fig. 13. This is an important arrangement as it is readily seen it must save much time in producing a word, as otherwise the position of each word would have to be ascertained, and its "shift" key depressed.

A modified form of the mechanism just described consists of dispensing with the comb teeth or pin projections $t$ or $t'$ on the levers I, H, I' of Fig. 1, with plane surfaces and providing the transverse bars or levers $T^3$ with such pin projections.

The transverse bars or levers just described may be furnished with an extra set of word keys shown by the dotted line squares $V^5$, and an elongated end $V^6$ and slot $v^3$ with a cross bar or plate $V^7$ securely attached at $v^4$ to the two end levers and passing in similar slots $v^3$ through the other levers to serve as a "shift" piece to move all of the transverse bars or levers into a shifted or other position represented partially by the series of dotted set pins $V^8$. These transverse bars or levers may be made long so that several longitudinal "shifts" may be given to the same, thereby bringing several different sets of words into combination, or at each shift all of the words of the second, third, fourth, etc., positions. Or, the said transverse bars or levers may be pivoted as previously described at $t^3$ (without the shift key levers $U^2$, $U^2$ or with the same placed to operate transversely upon the front edge of the frame T) and be shifted with the said frame by means of the parallel guides $T^4$, $T^4$, secured to the bed and movable in said frame T instead of the guides U U.

In Fig. 14 is seen more clearly the arrangement of the prefix and suffix type combination and the positions from which they operate.

The terms "differential" and "differentially" herein employed are used in the sense that, during the formation of type into different words at different times, each different word key causes a "different" or "differential" lot of type carried by the type bars to set for the formation of one word as in contra-distinction to the characteristic grouping of the type of such supports which will be caused to assemble or set for any other word; and the use of the above terms as applied to the variable or "differential" carriage feed is to indicate that the carriage at different times will be caused to move any one of several different lengths of movement, which lengths of movement will be different or "differential" with respect to each other.

The manner of operation and construction, herein set forth, is considered sufficient to demonstrate the production of words and parts of words, under the principle of invention involved in this application. It is not in any wise to be understood from what is here shown, that I limit myself, or that I am limited, to the use of such constructions, for I am able to produce the result desired in many ways, as in the production of words and groups of characters, by single or concerted touch, under the same principle of invention.

In view of the extensive character of this invention, and of the possibility of forming a variety of structural modifications, I do not limit myself to the specific construction here shown, but seek to cover in a broad sense, the principle of invention involved.

Having now described my invention, what I claim is:

1. A typewriting machine comprising type supports, mechanism to move a plurality of type simultaneously into assembled position for the production of a word or other group of characters, the said type supports being independently movable, and mechanism operating upon and coacting with said first named mechanism to simultaneously move a number of separately movable characters into printing position by the movement of a single key, substantially as set forth.

2. A typewriting machine comprising type supports, mechanism to move a plurality of type simultaneously into assembled position for the production of a word or other group of characters, the said type supports being independently movable, and mechanism operating upon said first named mechanism to simultaneously move a number of separately movable characters into printing position by the movement of a single key, and means for altering the word combinations, substantially as set forth.

3. In a typewriting machine, comprising type supports, mechanism to move a number of type simultaneously into assembled position for the production of a word or other group of characters, and mechanism operating upon said first named mechanism to simultaneously move a number of said characters into printing position, the second named mechanism comprising word keys having one or more words or groups of characters upon each key, a shifting mechanism for altering the word combinations, and keys for operating said shifting mechanism, said last mentioned keys bearing indications corresponding in position and style with the words upon the word keys, substantially as set forth.

4. A typewriting machine having word keys and shift keys, one or more words or groups of characters being placed upon each of said word keys, a word on a word key and a designation on a shift key, the latter corresponding in style to the style of character of a word on a word key, the words differing in styles of character from each other, substantially as set forth.

5. A typewriting machine having type supports, levers to operate said supports, projections upon said levers, movable transverse bars or plates crossing said levers and adapted to bear upon said projections to depress said levers by the movement of a single word key, to simultaneously throw a number of type characters corresponding to a word upon the key depressed into printing position, substantially as set forth.

6. A typewriting machine having type supports, mechanism to operate said supports, mechanism to move a plurality of type into alignment, said type supports being independently movable, word keys, and mechanism actuated by said word keys to operate said first named mechanism to simultaneously assemble certain of said type, substantially as set forth.

7. A typewriting machine having type supports, mechanism for operating said supports and mechanism communicating with word keys each key adapted to produce one or more words, whereby the operation of said keys will cause to move into printing position combinations of type characters corresponding with a word or words upon said keys, and a combination shifting mechanism comprising a lever communicating with shift keys when operated shifting said word key mechanism, each key imparting a different shift to the word mechanism, substantially as set forth.

8. A typewriting machine having type supports, mechanism arranged in parallel lines for operating said supports, said type supports being independently movable, transverse bars or plates crossing said mechanism, said bars being actuated by word keys to operate said type support mechanism, to move type characters into printing position, substantially as set forth.

9. A typewriting machine having type supports, pivoted bars or levers operating said supports to bring into printing position a combination of type characters, said pivoted bars or levers arranged in parallel lines, pivoted bars or plates crossing said bars or levers and arranged in parallel lines, word keys actuating said transverse bars or plates, means for supporting and guiding said transverse bars or plates and a shifting mechanism for altering the position of said transverse bars or plates, substantially as set forth.

10. A typewriting machine having type supports, pivoted bars or levers operating said supports to bring into printing position a combination of type characters, said pivoted bars or levers arranged in parallel lines, pivoted bars or plates crossing said bars or levers and arranged in parallel lines, word keys actuating said transverse bars or plates, a sliding frame for supporting said transverse bars or plates, said frame made movable on guides, and means for shifting said frame and bars or plates, substantially as set forth.

11. A typewriting machine having type supports, mechanism for operating said supports, and mechanism for operating said type support mechanism, a pivoted shift lever actuated by shift keys, said keys having different movements, and means for limiting said movements, a tension device maintaining the normal position of said second mentioned mechanism, and a tension device supporting said shift lever, substantially as set forth.

12. In a machine having a plurality of type, mechanism for simultaneously assembling said type, mechanism for operating said type assembling mechanism, and word keys connected with said last named mechanism, the operation of a key serving to assemble and impress a word, substantially as set forth.

13. In a machine having type and means for simultaneously assembling said type, and means for forming combinations of characters of said type, the said latter means consisting of a body having projections to act upon type assembling mechanism, substantially as set forth.

14. A typewriting machine having type supports, levers for operating said supports, a group of three levers actuating one support, a key communicating with each lever, each key having one or more characters represented thereon, one lever of each group actuating one or more type supports and itself also actuated by its adjacent levers, one of said levers actuating a shift for changing the position of its respective type support, each of said levers serving also to laterally shift the position of the platen over its respective type character or characters, substantially as set forth.

15. A typewriting machine having type supports, levers for operating said supports, a group of three levers actuating one support, a key communicating with each lever, each key having one or more characters represented thereon, one lever of each group actuating one or more type supports, and itself also actuated by its adjacent levers, one of said levers having a shift consisting of an inclined slot and a pin operating therein, said pin secured to a sliding piece, said sliding piece pivotally bearing a type support, and adapted with said support to be shifted in position by the operation of said lever and mechanism, substantially as set forth.

16. A typewriting machine having a plurality of type bars, each of said bars having a plurality of type, means comprising a differential selecting mechanism for moving a plurality of said bars and type simultaneously into printing position for the production of a designated group of characters, said means comprising word keys, said bars being substantially transverse to the longitudinal line of printing, and means for guiding said bars to assemble the type in word position, substantially as set forth.

17. A typewriting machine having a plurality of type bars, means comprising a differential selecting mechanism for moving a plurality of said bars and type simultaneously into printing position for the production of a designated group of characters, said means comprising word keys, the said movement being also transverse to the longitudinal line of printing, means for guiding said bars to assemble said type into word positions, and means for returning said assembled type bars to their original positions, substantially as set forth.

18. A typewriting machine having a plurality of pivoted type bars, means comprising a differential selecting mechanism for moving a plurality of said bars and type simultaneously into printing position for the production of a designated group of characters, said means comprising word keys, the movement being along and transverse to the longitudinal line of printing, means comprising guides for guiding said bars to assemble said type into such positions, and means comprising a reacting device for returning said type bars to their original positions, substantially as set forth.

19. A typewriting machine having a plurality of type bars, means comprising a differential selecting mechanism for simultaneously operating a plurality of said bars to move such type into assembled position for printing, the said movement being along and transverse to the longitudinal line of printing, and guides for guiding the movement of said type into assembled position for the production of a designated group of characters, substantially as set forth.

20. A typewriting machine having a paper support, parallel bodies supporting a movable type support, character keys, plates movable on guides to laterally shift the position of the paper support by the depression of certain character keys, and means for moving said plates by the action of said keys, substantially as set forth.

21. A typewriting machine having a paper support, parallel bodies supporting a movable type support, plates movable on guides to laterally shift the position of the paper support by the depression of certain character keys, pivoted arms or levers communicating with said parallel bodies and supporting parallel transverse set plates or bars, said set plates or bars actuated by projections upon the mechanism operated by the character keys to shift the position of the paper support laterally to two or more positions, substantially as set forth.

22. A typewriting machine having type supports, levers to operate said supports, movable transverse bars or plates crossing said levers, projections between said levers and bars or plates upon which one of said sets of parts are adapted to bear to actuate the levers by the movement of a single word key to simultaneously throw a number of type characters corresponding to a word upon the key depressed into printing position, substantially as set forth.

23. A typewriting machine having type supports and type, a paper support, paper feed mechanism laterally movable with the movement of certain of said type supports, character keys, parallel bodies movably connected with the type supports, means comprised within said parallel bodies and type supports to shift the position of the latter, and to laterally shift the position of the paper support by the depression of certain character keys, and a means also for moving said parallel bodies by the action of said paper feed mechanism, pivoted arms or levers communicating with said parallel bodies and supporting parallel transverse set plates or bars, said set plates or bars actuated by projections upon the mechanism operated by the character keys to shift the position of the paper support laterally to two or more positions, substantially as set forth.

24. A typewriting machine having type supports, word keys, levers to operate said supports, movable transverse bars or plates crossing said levers, said bars or plates having projections adapted to bear upon and actuate the levers by the movement of a single word key to simultaneously throw a number of type characters corresponding to a word upon a key depressed into printing position, substantially as set forth.

CLYDE C. BALSTON.